US007668932B2

(12) United States Patent
Cugi et al.

(10) Patent No.: US 7,668,932 B2
(45) Date of Patent: Feb. 23, 2010

(54) METHOD, SYSTEM, APPARATUS AND COMPUTER PROGRAM PRODUCT FOR ENABLING THE PRE-DOWNLOAD OF MEDIA OBJECTS

(75) Inventors: Guido Cugi, Helsinki (FI); Oliver Bremer, Helsinki (FI)

(73) Assignee: Nokia Corporation, Espoo (FI)

( * ) Notice: Subject to any disclaimer, the term of this patent is extended or adjusted under 35 U.S.C. 154(b) by 446 days.

(21) Appl. No.: 11/172,049

(22) Filed: Jun. 30, 2005

(65) Prior Publication Data

US 2007/0005647 A1 Jan. 4, 2007

(51) Int. Cl.
G06F 15/16 (2006.01)
(52) U.S. Cl. ...................................... 709/217
(58) Field of Classification Search ................. 709/217
See application file for complete search history.

(56) References Cited

U.S. PATENT DOCUMENTS

| 2003/0084138 | A1* | 5/2003 | Tavis et al. ................. 709/223 |
| 2003/0172108 | A1 | 9/2003 | Paul et al. |
| 2004/0064476 | A1 | 4/2004 | Rounds |
| 2004/0176080 | A1* | 9/2004 | Chakravorty et al. ..... 455/414.1 |
| 2005/0039178 | A1* | 2/2005 | Marolia et al. .............. 717/168 |
| 2005/0071418 | A1* | 3/2005 | Kjellberg et al. ............ 709/200 |
| 2005/0144251 | A1* | 6/2005 | Slate ........................ 709/215 |
| 2005/0177624 | A1* | 8/2005 | Oswald et al. .............. 709/219 |
| 2005/0204019 | A1* | 9/2005 | Flynn et al. ................ 709/219 |
| 2006/0047775 | A1* | 3/2006 | Bruck et al. ................ 709/217 |
| 2006/0059267 | A1* | 3/2006 | Cugi et al. ................. 709/230 |
| 2006/0085517 | A1* | 4/2006 | Kaurila ...................... 709/217 |
| 2006/0195507 | A1* | 8/2006 | Baek et al. .................. 709/203 |

OTHER PUBLICATIONS

International Search Report from PCT/IB2006/001706, dated Sep. 25, 2006.
Open Mobile Alliance (OMA), Enabler Release Definition for Download, Specification, Jun. 25, 2004, Version 1.0, pp. 1-13.
Open Mobile Alliance (OMA), Download Architecture, Specification , Jun. 25, 2004, Version 1.0, pp. 1-21.
Open Mobile Alliance (OMA), Generic Content Download Over the Air, Specification , Jun. 25, 2004, Version 1.0, pp. 1-40.

* cited by examiner

*Primary Examiner*—Benjamin R Bruckart
(74) *Attorney, Agent, or Firm*—Alston & Bird LLP

(57) ABSTRACT

A method, computer program product, electronic device and system for enabling the pre-download of media objects are provided. In particular, means can be provided by which Download Descriptor can be maintained alongside a pre-downloaded media object associated with the Download Descriptor until the pre-downloaded media object is consumed.

25 Claims, 3 Drawing Sheets

METHOD, SYSTEM, APPARATUS AND COMPUTER PROGRAM PRODUCT FOR ENABLING THE PRE-DOWNLOAD OF MEDIA OBJECTS

FIELD OF THE INVENTION

Embodiments of this invention relate to the downloading of media objects over the air, and more particularly to mechanisms used to enable a user to pre-download the media objects prior to installation.

BACKGROUND OF THE INVENTION

It is often desirable for a user of an electronic device, such as, for example, a cellular telephone, portable digital assistant (PDA), personal computer (PC), laptop, or tablet, to have the ability to download various media objects from a network (e.g., a Wide Area Network (WAN), a Local Area Network (LAN), a Wireless LAN (WLAN), or a Metropolitan Area Network (MAN)). Examples of media objects that could be downloaded and used by the electronic device include ringtones, images, music or video files, and applications.

In many instances it would be desirable for the user to be able to "pre-download" the media objects. In other words, the user could download one or more media objects from a server on the network and then wait to decide whether or not to consume (e.g., install, play, or save to) each pre-downloaded media object at some later point in time. The pre-downloading of media objects (and, in fact, any downloading of the media object whether immediately prior to consumption or at some earlier point in time) often involves the use of an application residing on the electronic device that is responsible for downloading and consuming the media objects. This entity is referred to herein as a Download Agent.

For example, the Download Agent may download one or more media objects to the electronic device from a Download Server, with the media objects to be installed, or otherwise consumed, by the user of the electronic device at some later point in time. The Download Agent my further notify the Download Server (or, more generally, the network entity from which the media object was downloaded) when each media object has been successfully downloaded. If and when the user decides that he or she would like to consume (e.g., install) the media object previously downloaded, the Download Agent will perform the steps necessary for consumption (in this example installation), and thereafter may inform the Download Server that the media object has been successfully installed. Installation is complete when the media object has been prepared for execution/rending on the electronic device. Following installation, the media object is then available to the user on the device.

One advantage to the pre-downloading of media objects is that once a user decides that he or she wishes to consume one or more media objects, the user is able to do so immediately. Since the media objects are already downloaded, the user need not wait until downloading is complete to consume the media object. Another advantage is that by notifying the Download Server of successful downloads and consumptions, the Download Server can be aware of not only what media objects are downloaded, but also which of the downloaded media objects are successfully consumed by the user.

Before a media object can be downloaded to a device, and, more particularly, before a previously downloaded media object can be consumed, a Download Descriptor associated with the media object must be made available to the Download Agent. The Download Descriptor may, for example, be retrieved from the Download Server by browsing a website. Alternatively, or in addition, the electronic device hosting the Download Agent may support the reception of the Download Descriptor by way of, for example, MMS (Multimedia Messaging Service), email, or some other instant messaging protocol.

The information in the Download Descriptor, which contains metadata relative to the particular media object associated with it, may be used, for example, by the Download Agent to initially verify that the electronic device is capable of using and/or rendering the media object with which the Download Descriptor is associated (e.g., to verify that the electronic device has sufficient memory based on the size and type of the media object). The Download Descriptor may further include the scheme that should be used by the Download Agent to download the media object, as well as instructions to send a Download Complete Notification to the Download Server once the media object is successfully downloaded. A user can also use the information in the Download Descriptor to confirm (or decide) that he or she wants to install, or otherwise consume, the media object. For this purpose, the Download Descriptor may include information such as the name, vendor, size, type, description and download time of the media object. The Download Descriptor may further include an instruction to send an Installation Complete Notification to the Download Server once the media object has been successfully installed.

In the case of pre-downloading media objects, wherein a period of time passes between when the media object is downloaded to the electronic device and when the user actually consumes the media object, it is important that the Download Descriptors associated with respective media objects be stored and bound to the respective media object at least until consumption occurs. Currently, there is no means by which Download Descriptors can be stored alongside their respective pre-downloaded media object between the time when the media object is downloaded and when it is first accessed or consumed (e.g., installed).

A need, therefore, exists for a means by which one or more Download Descriptors associated with respective media objects, which have been pre-downloaded, can be tied to their respective media objects during the period of time between download and consumption, and wherein the Download Descriptors can be readily accessed by a Download Agent, or other application, for the purposes of consumption.

BRIEF SUMMARY OF THE INVENTION

Generally described, various exemplary embodiments of the present invention provide an improvement over the known prior art by providing a means by which a Download Descriptor can be maintained alongside a pre-downloaded media object associated with the Download Descriptor until the pre-downloaded media object is accessed or consumed (e.g., installed, played, or saved to). In particular, exemplary embodiments of the present invention introduce a download entity, known as the Download Manager, that implements and maintains a database including a mapping of the pre-downloaded media objects to their respective Download Descriptor.

According to one exemplary aspect of the present invention a method of enabling the pre-download of one or more media objects to an electronic device is provided. In one exemplary embodiment, the method includes: (1) downloading a media object; (2) gaining access to a download descriptor associated with the media object; and (3) storing a mapping between the download descriptor and the media object in a database accessible by the electronic device. This mapping can then be used to retrieve the download descriptor when a user wishes to consume the media object. In one exemplary embodiment, the method also includes (4) accessing the download descriptor; and (5) using the download descriptor to consume the media object. This method may further include removing the mapping from the database once the media object has been consumed.

In one exemplary embodiment, the media objects are downloaded from a download server. The method of this exemplary embodiment may further include notifying the download server when the media object has been successfully downloaded and/or when the media object has been successfully consumed.

According to another aspect of the present invention, a computer program product for enabling the pre-download of one or more media objects to an electronic device is provided. In one exemplary embodiment, the computer program product includes at least one computer-readable storage medium having computer-readable program code portions stored therein. These computer-readable program code portions may include: (1) a first executable portion for downloading a media object; (2) a second executable portion for gaining access to a download descriptor associated with the media object; and (3) a third executable portion for storing a mapping between the download descriptor and the media object in a database accessible by the electronic device. In one exemplary embodiment, this mapping can be used to retrieve the download descriptor when a user wishes to consume the media object.

According to yet another aspect of the present invention, a system for enabling the pre-download of one or more media objects is provided. In one exemplary embodiment, the system includes: an electronic device; a download server accessible by the electronic device for the purpose of downloading one or more media objects, and further for the purpose of accessing one or more download descriptors associated with respective media objects; and a database accessible by the electronic device, wherein the electronic device stores one or more mappings of the media objects to their respective download descriptors in the database such that the mappings are usable to retrieve the download descriptor associated with a particular media object when a user decides to consume the particular media object.

In another exemplary embodiment, the system includes: (1) means for downloading a media object; (2) means for gaining access to a download descriptor associated with the media object; and (3) means for storing a mapping between the download descriptor and the media object in a database accessible by the electronic device, wherein the mapping can be used to retrieve the download descriptor when a user wishes to consume the media object.

According to another aspect of the present invention an electronic device capable of pre-downloading one or more media objects is provided. In one exemplary embodiment the electronic device includes a processor; and a memory module in communication with the processor that stores an application executable by the processor, wherein the application is capable, upon execution, of maintaining a database of one or more mappings of the media objects to respective download descriptors, the application further capable, upon execution, of accessing the database and using the mappings to retrieve the download descriptor associated with a particular media object when a user decides to consume the particular media object.

In one exemplary embodiment, the electronic device further includes a display, and the processor is further capable, upon execution, of generating an icon for respective downloaded media objects and displaying the icons on the electronic device display. In another exemplary embodiment, the application is further capable, upon execution, of consuming a particular media object in response to a user selecting the icon associated with that media object from the display.

BRIEF DESCRIPTION OF THE DRAWING

Figure 1:
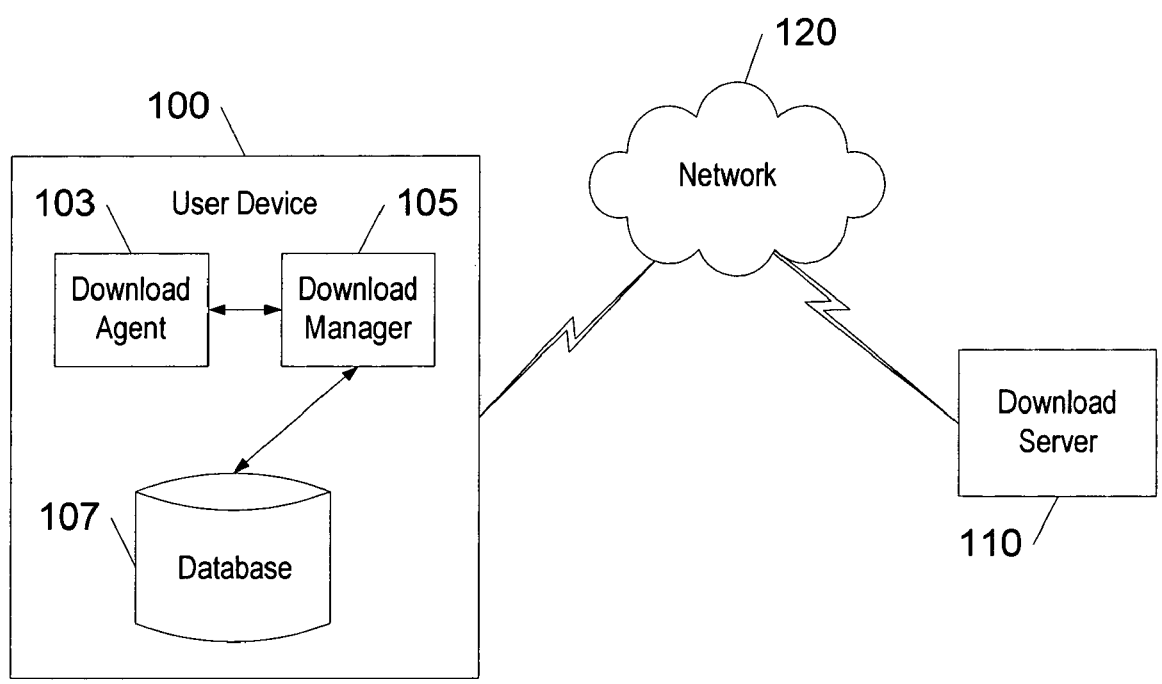
Figure 2:
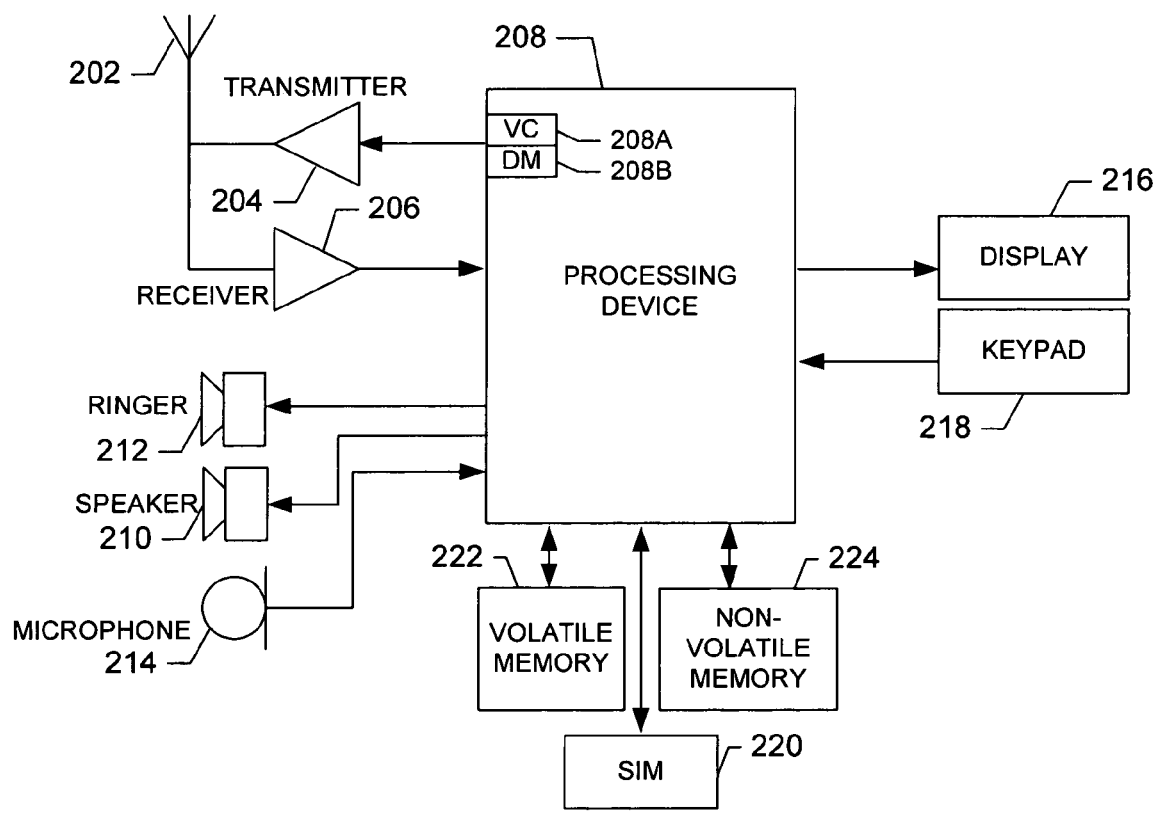
Figure 3:
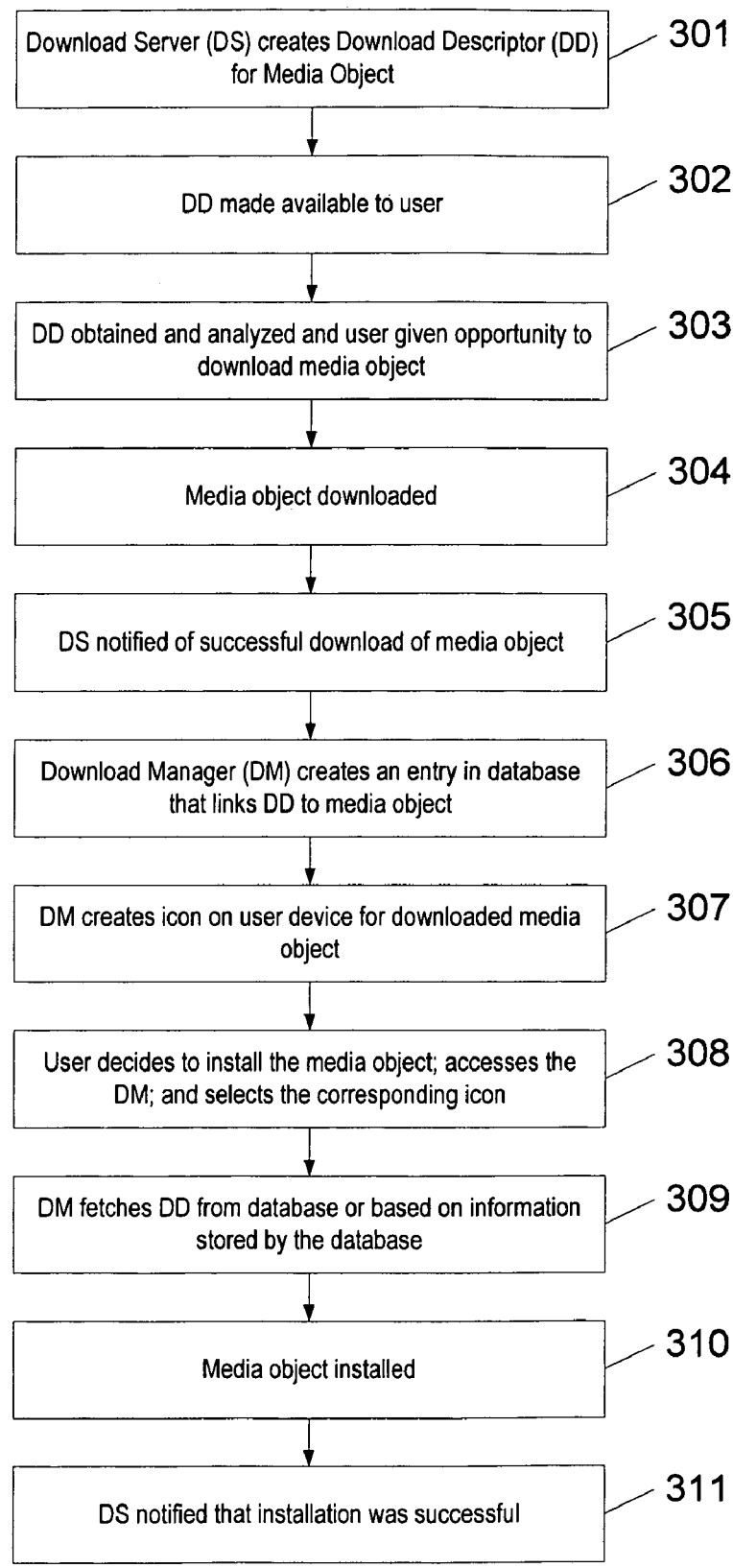

Having thus described the invention in general terms, reference will now be made to the accompanying drawings, which are not necessarily drawn to scale, and wherein:

FIG. 1 is a block diagram of a system that would benefit from exemplary embodiments of the present invention;

FIG. 2 is a schematic block diagram of a mobile station capable of operating in accordance with an embodiment of the present invention; and FIG. 3 is a flow chart illustrating the steps taken in a pre-downloading and installation process in accordance with exemplary embodiments of the present invention.

DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview:

Exemplary embodiments of the present invention provide a means by which Download Descriptors can be bound to their respective pre-downloaded media objects at least during the period of time between when the respective media object is first downloaded and when the media object is consumed (e.g., installed, played or saved to). In particular, exemplary embodiments of the present invention provide a Download Manager, which acts as a download entity for the electronic device in order to keep track of the downloading transactions performed by the user.

In various exemplar embodiments, the Download Manager implements and maintains a database including a mapping of Download Descriptors to their respective pre-downloaded media objects. Each time a media object is downloaded, the Download Manager will update the database with the new media object and its Download Descriptor. When a user wants to install, or otherwise consume, a particular pre-downloaded media object, he or she can first access the Download Manager via the electronic device where he or she will find a representation of the media objects, such as one or more icons representing respective media objects that have been previously downloaded. The user can select the pre-downloaded media object he or she wishes to install, and, in response, the Download Manager will access the database and retrieve the Download Descriptor corresponding to that media object. The Download Agent can then use the retrieved Download Descriptor to install the media object.

In general, therefore, in exemplary embodiments the Download Manager is responsible for maintaining the binding between media objects and their respective Download Descriptor and keeping track of the status of the download transactions. The Download Manager can then use this information (i.e., the binding and the status) to inform the Download Agent of what to do. The Download Agent can then be responsible for the actual downloading and consumption, and for communications with the Download Server. While the exemplary embodiment discussed herein assume a one-to-one relationship between the Download Manager and the Download Agent, as will be understood by those of skill in the art, a single Download Manager may be responsible for overseeing and managing the activities of multiple Download Agents.

System And Terminal Architecture:

Referring to FIG. 1, an illustration of one type of system that would benefit from embodiments of the present invention is provided. As shown, the system may include a User Device 100, such as, for example, a cellular telephone, personal digital assistant (PDA), pager, personal computer (PC), laptop, or tablet, or any other similar device. The User Device 100 is connected to a Download Server 110 via a data network 120, such as, for example, a local area network (LAN), wireless local area network (WLAN), metropolitan area network (MAN), and/or wide area network (WAN), e.g., the Internet, for the purpose of downloading one or more media objects (e.g., ringtones, images, video or music files, and applications) to be used by the User Device 100.

In the exemplary embodiment shown, the User Device 100 comprises, or is otherwise associated or in communication with, a Download Agent 103, a Download Manager 105 and a database 107, which includes a mapping of Download Descriptors to respective media objects and is accessible by the Download Manager 105. Although shown as separate entities or applications, the functions of the Download Agent and the Download Manager may be performed by the same entity or application, if so desired. In addition, as stated above, while FIG. 1 shows a one-to-one relationship between the Download Manager 105 and the Download Agent 103, multiple Download Agents 103 may be overseen and managed by the Download Manager 105. As discussed herein, the Download Agent 103 is the entity ultimately responsible for the downloading and consumption of media objects onto the User Device 100. The Download Manager 105 tracks and oversees the downloading transactions. The database, in turn, stores the Download Descriptors or information from which the Download Descriptors can be located as well as information that associates the Download Descriptors with respective media objects. The Download Manager 105 therefore also accesses the database 107 in order to retrieve Download Descriptors associated with particular media objects being consumed.

In one exemplary embodiment, the User Device 100 may be a mobile terminal, or mobile station, shown in detail in FIG. 2. The mobile terminal, or other electronic or digital device, includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include an antenna 202, a transmitter 204, a receiver 206, and means, such as a processing device 208, e.g., a processor, controller or the like, that provides signals to and receives signals from the transmitter 204 and receiver 206, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G, third-generation (3G) and/or fourth-generation (4G) mobile communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 208, such as a processor, controller or other computing device, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 208 thus also includes the functionality to convolutionally encode and interleave message and data prior to modulation and transmission. The processing device can additionally include an internal voice coder (VC) 208A, and may include an internal data modem (DM) 208B. Further, the processing device 208 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 210, a ringer 212, a microphone 214, a display 216, all of which are coupled to the controller 208. The user input interface, which allows the mobile device to receive data, can comprise any of a number of devices allowing the mobile device to receive data, such as a keypad 218, a touch display (not shown), a microphone 214, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 220, a removable user identity module (R-UIM) (not shown), or the like, which typically stores information elements related to a mobile subscriber. In addition to the SIM, the mobile device can include other memory. In this regard, the mobile station can include volatile memory 222, as well as other non-volatile memory 224, which can be embedded and/or may be removable. For example, the other non-volatile memory may be embedded or removable multimedia memory cards (MMCs), Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for implementing and maintaining a database including a mapping of one or more Download Descriptors to their respective pre-downloaded media objects, and for accessing the database when a user wishes to consume a particular pre-downloaded media object.

The system, method, device and computer program product of exemplary embodiments of the present invention are primarily described in conjunction with mobile communications applications. It should be understood, however, that the system, method, device and computer program product of embodiments of the present invention can be utilized in conjunction with a variety of other applications, both in the mobile communications industries and outside of the mobile communications industries. For example, the system, method, device and computer program product of exemplary embodiments of the present invention can be utilized in conjunction with wireline and/or wireless network (e.g., Internet) applications.

Also, it should be understood that while the terminal was illustrated and described as comprising a mobile telephone, mobile telephones are merely illustrative of one type of terminal that would benefit from the present invention and, therefore, should not be taken to limit the scope of the present invention. While several embodiments of the terminal are illustrated and described for purposes of example, other types of terminals, such as portable digital assistants (PDAs), pagers, laptop computers, tablets, and other types of electronic systems including both mobile, wireless devices and fixed, wireline devices, can readily employ embodiments of the present invention.

Pre-Download of Media Objects:

As discussed above, exemplary embodiments of the present invention provide a download entity, referred to as a Download Manager, which resides on or is otherwise accessible by the User Device and keeps track of all downloading transactions. In particular, each time a user downloads a media object that he or she may wish to install on the user device, or otherwise consume, at some later point in time, the Download Manager will create an entry in a database for that media object. The entry will tie the pre-downloaded media object to its Download Descriptor, which has been previously made available to the User Device. In one exemplary embodiment, the Download Agent retrieved the Download Descriptor from the Download Server via a website and then made the Download Descriptor available to the Download Manager along with a pointer to the pre-downloaded media object. Alternatively, as discussed above, the User Device may have received the Download Descriptor by way of an instant message or email. The Download Manager may store the Download Descriptor in the database or may store an address or other pointer in the database that identifies and locates the Download Descriptor which may be stored elsewhere.

The Download Manager will typically also create an icon or other representation of the pre-downloaded media object on the display 216 of the User Device. When a user wishes to consume (e.g., install) the pre-downloaded media object, he or she will select the icon, which can be accessed through the Download Manager, and in response, the Download Manager will retrieve the Download Descriptor from the database or based on information contained by the database. The Download Agent can then proceed with consumption (e.g., installation) using the retrieved Download Descriptor. It should be apparent that while the selection of an icon indicative of the pre-downloaded media object is an expedient technique for making such a selection, the pre-downloaded media object may be selected in other manners without departing from the scope of the present invention.

FIG. 3 provides a flow chart that more particularly describes the steps taken in the pre-downloading and installation process of a particular media object, in accordance with one exemplary embodiment. As shown, the first step of the process, Step 301, is the creation of the Download Descriptor associated with the media object by a Download Server. As stated above, the Download Descriptor includes metadata relative to the media object describing, for example, the name, vendor, size, type, description and download time of the media object. Once the Download Descriptor has been created, it is made available to the user device (Step 302) by means of, for example, a reference on a website accessible by the user device, or in an email or message received by the user device.

In step 303, the Download Descriptor is obtained and analyzed in order to determine whether or not the user wishes to download the media object, and whether or not the user device is capable of using and/or rendering the media object. In one exemplary embodiment, this is done by the Download Agent. In another exemplary embodiment, where the Download Manager and the Download Agent are integrated, the Download Manager may perform this step. If the user wants to and the user device is capable, the media object is downloaded to the user device in Step 304. In one exemplary embodiment, this too is performed by the Download Agent.

Once the media object has been successfully downloaded, a message may be sent to the Download Server notifying the server of the successful download (Step 305). In one exemplary embodiment, this step is performed only where the Download Descriptor indicates that a Download Complete Notification should be sent. In one exemplary embodiment, the Download Agent is the entity that is responsible for sending the notification.

In Step 306, the Download Manager creates an entry in the database accessible by the Download Manager that links the downloaded media object to its Download Descriptor. As stated above, in one exemplary embodiment, the database resides on the user device itself. The Download Manager may then create an icon that can be displayed on the user device that corresponds with the downloaded media object (Step 307). A user can access the icon by way of the Download Manager.

After some period of time, the user then decides that he or she wants to install the pre-downloaded media object. In order to do so, the user accesses the Download Manager on his or her user device, and selects the downloaded media object, such as by means of the icon that corresponds with the downloaded media object he or she wishes to install (Step 308). In response, in Step 309, the Download Manager will fetch the Download Descriptor associated with the selected media object from the database or based on information, such as a pointer or other address, stored by the database. The downloaded media object can then be installed using the Download Descriptor (Step 310). In one exemplary embodiment, the Download Agent uses the fetched Download Descriptor to install the media object. Finally, in Step 311, the Download Server may be notified of the successful installation of the pre-downloaded media object. As in the instance of the Download Complete Notification, in one exemplary embodiment, an Installation Complete Notification is only sent where the Download Descriptor includes an instruction to do so. In one exemplary embodiment the notification is sent by the Download Agent.

Once the media object has been successfully downloaded and installed, the Download Manager may optionally, in one exemplary embodiment, remove the entry in the database for that media object.

As will be appreciated by one skilled in the art, the embodiments of the present invention described above may be embodied as a system, method, mobile terminal device or other apparatus, or computer program product. Accordingly, the present invention may take the form of an entirely hardware embodiment, an entirely software embodiment, or an embodiment combining software and hardware aspects. Furthermore, embodiments of the present invention may take the form of a computer program product on a computer-readable storage medium having computer-readable program instructions (e.g., computer software) embodied in the storage medium. For example, the Download Agent and the Download Manager may be defined as a computer program product. More particularly, the present invention may take the form of web-implemented computer software. Any suitable computer-readable storage medium may be utilized including hard disks, CD-ROMs, optical storage devices, or magnetic storage devices.

The present invention is described above with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks, although other means for implementing the functions including various combinations of hardware, firmware and software as described herein may also be employed.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   gaining access to a download descriptor associated with a media object by an electronic device, wherein the download descriptor comprises metadata relative to the media object, the metadata comprising a description of one or more of name, vendor, size, type, description, usage requirements, rendering requirements, download instructions, installation information, or download time of the media object;
   determining, at the electronic device, whether the electronic device is capable of downloading the media object from a remote device based at least in part on information included in the download descriptor;
   pre-downloading the media object, when it is determined that the electronic device is capable;
   creating with a download manager, in response to pre-downloading the media object, a mapping between the download descriptor and the pre-downloaded media object in a database stored on the electronic device;
   using the mapping to retrieve the download descriptor, in response to the download manager receiving a selection of the pre-downloaded media object;
   consuming the pre-downloaded media object using the download descriptor; and
   removing, with the download manager, the mapping from the database once the pre-downloaded media object has been consumed.

2. The method of claim 1, wherein pre-downloading the media object comprises pre-downloading a media object from a download server.

3. The method of claim 2 further comprising:
   notifying the download server when the media object has been pre-downloaded, if the download descriptor comprises an instruction to notify the download server when the media object has been pre-downloaded.

4. The method of claim 2 further comprising:
   notifying the download server when the pre-downloaded media object has been consumed, if the download descriptor comprises an instruction to notify the download server when the pre-downloaded media object has been consumed.

5. The method of claim 2, wherein gaining access to the download descriptor comprises accessing a website maintained by the download server and retrieving the download descriptor from the website.

6. The method of claim 2, wherein gaining access to the download descriptor comprises receiving the download descriptor from the download server.

7. The method of claim 1, wherein consuming the pre-downloaded media object comprises installing the pro-downloaded media object.

8. A computer program product, wherein the computer program product comprises at least one computer-readable storage medium having computer-readable program code portions stored therein, the computer-readable program code portions comprising:
- a program code portion for gaining access to a download descriptor associated with a media object, wherein the download descriptor comprises metadata relative to the media object, the metadata comprising a description of one or more of name, vendor, size, type, description, usage requirements, rendering requirements, download instructions, installation information, or download time of the media object;
- a program code portion for determining whether an electronic device is capable of downloading the media object based at least in part on information included in the download descriptor;
- a program code portion for pre-downloading the media object when it is determined that the electronic device is capable;
- a program code portion for creating with a download manager, in response to pre-downloading the media object, a mapping between the download descriptor and the pre-downloaded media object in a database stored on the electronic device;
- a program code portion for using the mapping to retrieve the download descriptor, in response to the download manager receiving a selection of the pre-downloaded media object;
- a program code portion for consuming the pre-downloaded media object using the download descriptor; and
- a program code portion for removing, with the download manager, the mapping from the database once the pre-downloaded media object has been consumed.

9. The computer program product of claim 8, wherein said program code portion for pre-downloading the media object includes instructions for pre-downloading the media object from a download server.

10. The computer program product of claim 9 further comprising:
- a program code portion for notifying the download server when the media object has been pre-downloaded, if the download descriptor comprises an instruction to notify the download server when the media object has been pre-downloaded.

11. The computer program product of claim 9 further comprising:
- a program code portion for notifying the download server when the pre-downloaded media object has been consumed, if the download descriptor comprises an instruction to notify the download server when the pre-downloaded media object has been consumed.

12. The computer program product of claim 9, wherein said program code portion for gaining access to the download descriptor includes instructions for gaining access to the download descriptor by accessing a website maintained by the download server and retrieving the download descriptor from the website.

13. The computer program product of claim 9, wherein said program code portion for gaining access to the download descriptor includes instructions for gaining access to the download descriptor by receiving the download descriptor from the download server.

14. A system comprising:
- an electronic device;
- a download server, wherein the electronic device is configured to access the download server for the purpose of accessing one or more download descriptors associated with respective one or more media objects, and further for the purpose of pre-downloading one or more media objects to the electronic device, when it is determined that the electronic device is capable of pre-downloading respective media objects based at least in part on information included in the corresponding download descriptor, wherein the download descriptor comprises metadata relative to the media object, the metadata comprising a description of one or more of name, vendor, size, type, description, usage requirements, rendering requirements, download instructions, installation information, or download time of the media object; and
- a database stored on the electronic device, wherein the electronic device is configured to: create with a download manager, in response to pre-downloading one or more media objects, one or more mappings of the pre-downloaded media objects to their respective download descriptors in the database;
- use the mappings to retrieve the download descriptor associated with a particular pre-downloaded media object, in response to the download manager receiving a selection of the particular pre-downloaded media object;
- consume the pre-downloaded media object using the download descriptor; and remove, with the download manager, the mapping from the database once the pre-downloaded media object has been consumed.

15. The system of claim 14, wherein the electronic device is configured to notify the download server when one or more media objects has been pre-downloaded, if the corresponding download descriptor comprises an instruction to notify the download server when the media object has been pre-downloaded.

16. The system of claim 14, wherein the electronic device is configured to notify the download server when one or more pre-downloaded media objects has been consumed, if the corresponding download descriptor comprises an instruction to notify the download server when the pre-downloaded media object has been consumed.

17. An apparatus comprising at least one processor and at least one memory storing program code, wherein the at least one memory and program code are configured to, with the at least one processor, cause the apparatus to at least:
- gain access to a download descriptor associated with a media object, wherein the download descriptor comprises metadata relative to the media object, the metadata comprising a description of one or more of name, vendor, size, type, description, usage requirements, rendering requirements, download instructions, installation information, or download time of the media object;
- determine whether the apparatus is capable of downloading the media object based at least in part on information included in the download descriptor;
- pre-download the media object, when it is determined that the apparatus is capable;
- create, with a download manager, in response to pre-downloading the media object, a mapping between the download descriptor and the pre-downloaded media object in a database stored on the apparatus;
- access the database;
- use the mapping to retrieve the download descriptor in response to the download manager receiving a selection of the pre-downloaded media object; and
- consume the pre-downloaded media object using the download descriptor; and remove, with the download manager, the mapping from the database once the pre-downloaded media object has been consumed.

18. The apparatus of claim 17, wherein pre-downloading the media object comprises pre-downloading the media object from a download server.

19. The apparatus of claim 18, wherein the at least one memory and program code are configured to, with the at least one processor, further cause the apparatus to notify the download server when the media object is pre-downloaded, if the download descriptor comprises an instruction to notify the download server when the media object has been pre-downloaded.

20. The apparatus of claim 18 further comprising:
a display in communication with at least one of the at least one processor, wherein the at least one memory and program code are configured to, with the at least one processor, further cause the apparatus to generate an icon associated with the pre-downloaded media object and to present the icon on the display.

21. The apparatus of claim 18, wherein the at least one memory and program code are configured to, with the at least one processor, further cause the apparatus to notify the download server when the pre-downloaded media object is consumed, if the download descriptor comprises an instruction to notify the download server when the pre-downloaded media object has been consumed.

22. An apparatus comprising:
means for gaining access to a download descriptor associated with a media object, wherein the download descriptor comprises metadata relative to the media object, the metadata comprising a description of one or more of name, vendor, size, type, description, usage requirements, rendering requirements, download instructions, installation information, or download time of the media object;

means for determining whether the apparatus is capable of downloading the media object based at least in part on information included in the download descriptor;

means for pre-downloading the media object, when it is determined that the apparatus is capable;

means comprising a download manager for creating, in response to pre-downloading the media object, a mapping between the download descriptor and the media object in a database stored on the apparatus;

means for using the mapping to retrieve the download descriptor, in response to the download manager receiving a selection of the pre-downloaded media object; and means for consuming the pre-downloaded media object using the download descriptor; and means comprising the download manager for removing the mapping from the database once the pre-downloaded media object has been consumed.

23. The apparatus of claim 22, wherein said means for pre-downloading the media object comprises means for pre-downloading the media object from a download server.

24. The apparatus of claim 23 further comprising:
means for notifying the download server when the media object has been pre-downloaded, if the corresponding download descriptor comprises an instruction to notify the download server when the media object has been pre-downloaded.

25. The apparatus of claim 23 further comprising:
means for notifying the download server when the pre-downloaded media object has been consumed, if the corresponding download descriptor comprises an instruction to notify the download server when the pre-downloaded media object has been consumed.

* * * * *

UNITED STATES PATENT AND TRADEMARK OFFICE
CERTIFICATE OF CORRECTION

| | | |
|---|---|---|
| PATENT NO. | : 7,668,932 B2 | |
| APPLICATION NO. | : 11/172049 | |
| DATED | : February 23, 2010 | |
| INVENTOR(S) | : Cugi et al. | |

It is certified that error appears in the above-identified patent and that said Letters Patent is hereby corrected as shown below:

Column 10,

Line 66, "pro-down-loaded" should read --pre-downloaded--.

Signed and Sealed this
Twenty-first Day of June, 2011

David J. Kappos
*Director of the United States Patent and Trademark Office*